Patented Feb. 18, 1930

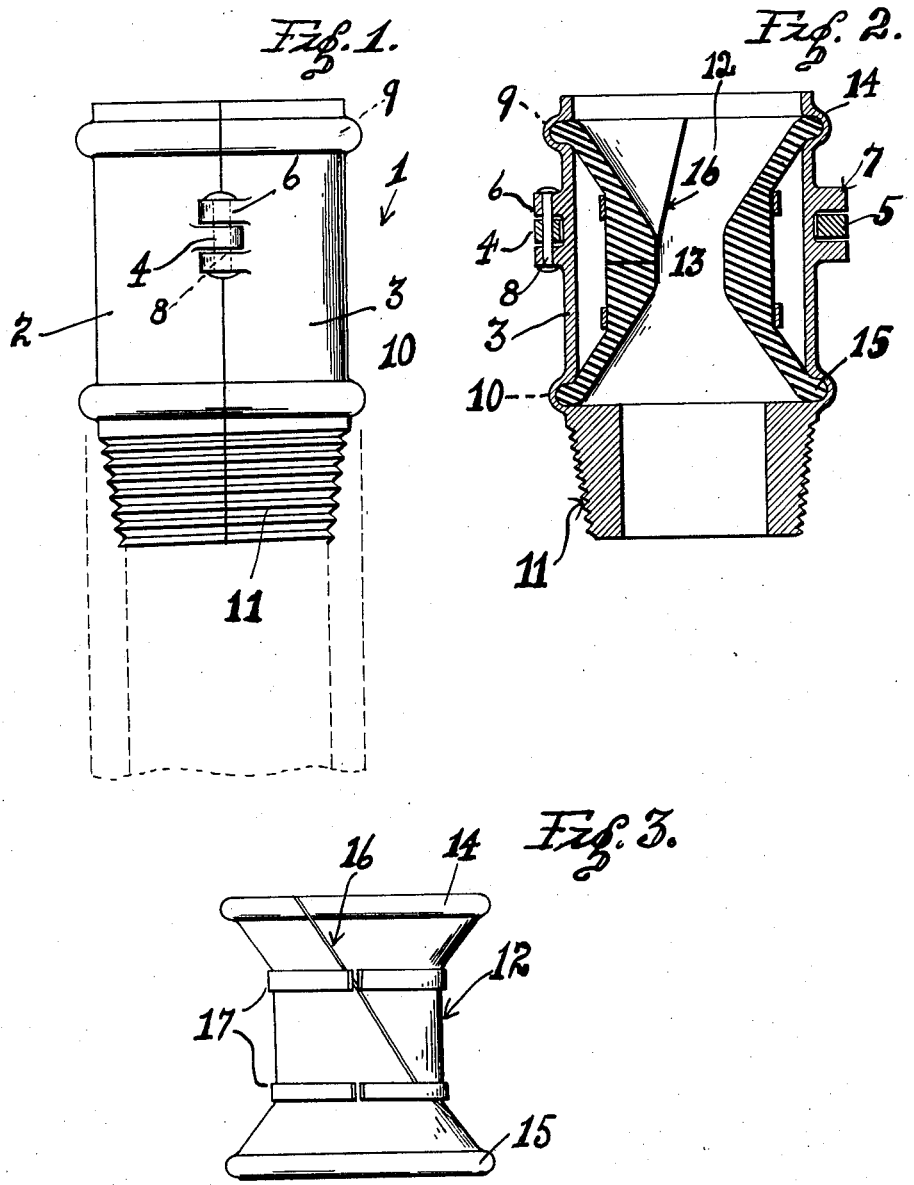

1,747,592

UNITED STATES PATENT OFFICE

GEORGE H. MORLANG, OF SANTA MONICA, CALIFORNIA

ROD WIPER

Application filed February 20, 1928. Serial No. 255,718.

In withdrawing sucker rods from an oil well, a quantity of oil necessarily remains on the rods as they are removed and unless this is stripped off and permitted to flow back into the well it will flow onto the floor of the derrick making a very unsightly and undesirable condition. Also, the sucker rods when they are oiled are difficult to handle in that they are slippery and the workman has difficulty in performing his task.

An object of my invention is to provide a rod wiper through which the rods pass as they are withdrawn from the well, so that the oil is removed therefrom.

Another object is to provide a rod wiper which can be assembled around the rods without having to pass the same over the top of the rods.

A further object is to provide a rod wiper through which the rod joints or the pump barrels can be passed without injuring the rod contacting member.

Still another object is to provide a rod wiper which will perform its duties effectively over a long period of time and without requiring any care on the part of the operator.

Other objects, advantages and features of invention, may appear in the accompanying drawings, the subjoined detailed descriptions and the appended claim.

In the drawing—

Fig. 1, is a side elevation of my rod wiper.

Fig. 2, is a longitudinal sectional view of the same.

Fig. 3, is a side elevation of the rubber rod contacting member.

Referring more particularly to the drawing, the numeral 1 indicates a metal body formed in two equal halves 2, 3, the part 2 being provided with lugs 4, 5, and the part 3, being provided with lugs 6, 7; the lugs being positioned diametrically opposed on the body sections and are positioned adjacent the cut between the bodies.

A pin 8, extends through the lugs 4, 6, thus pivotally securing the sections 2, 3, together. An annular groove 9, is provided adjacent the top of the body 1, and similarly, a groove 10 is provided adjacent the bottom thereof.

A threaded section 11, is provided at the bottom of the body, which section screws into the tubing thus holding the wiper in position and also serves to hold the two sections 2, 3, together.

A rubber rod contacting member 12, is positioned within the body 1, and there is a constricting neck portion 13 formed adjacent the center of the member 12, through which the rods pass and in passing this neck the oil is effectively stripped therefrom. The member 12, tapers outwardly towards the top and bottom from the neck 13, to annular beads 14, 15, at the top and bottom thereof respectively. The beads 14, 15, fit into the grooves 9, 10 respectively, thus holding the rod contacting member in position. The member 12, is provided with a cut 16, extending from the top to the bottom thereof so that this member may expand as the larger rod coupling sections pass therethrough. If desired spring clips 17, may encircle the member 12, adjacent the central portion thereof, thus tending to hold the member tightly about the rods.

Having described my invention, I claim:

A rod wiper comprising a two piece body, means hingably mounting said two pieces together, whereby the body may be assembled around the rod, a threaded section on said body adapted to screw into a tubing, said body having annular grooves therein adjacent the top and bottom thereof, a rod engaging member, beads formed on said rod engaging member adjacent the top and bottom thereof adapted to fit into said grooves whereby the rod engaging member is removably mounted in the body, said rod engaging member having a cut therethrough adapted to permit expansion thereof, and a constricted throat therein, through which the rods are adapted to pass, and springs encircling said rod engaging member whereby it is held firmly in contact with the rods.

In testimony whereof, I affix my signature.

GEORGE H. MORLANG.